United States Patent
Yamada et al.

[11] Patent Number: 5,974,025
[45] Date of Patent: Oct. 26, 1999

[54] OPTICAL RECORDING MEDIUM AND RECORDING AND REPRODUCING METHOD USING THE SAME

[75] Inventors: Katsuyuki Yamada; Yuki Nakamura; Eiji Noda; Kyohji Hattori; Kenichi Aihara; Fumiya Ohmi; Yujiro Kaneko, all of Shizuoka, Japan

[73] Assignee: Ricoh Company, Ltd., Tokyo, Japan

[21] Appl. No.: 09/133,378

[22] Filed: Aug. 13, 1998

[30] Foreign Application Priority Data

Aug. 15, 1997 [JP] Japan .................................. 9-239557

[51] Int. Cl.⁶ .............................. G11B 3/70; B32B 3/00
[52] U.S. Cl. ...................... 369/288; 428/64.1; 428/64.4
[58] Field of Search ................... 369/13, 275.2, 369/275.3, 275.4, 288, 283; 428/64.8, 64.5, 64.4, 64.6, 64.1, 64.2, 688, 697, 913; 430/270.14, 270.11, 270.12, 270.13

[56] References Cited

U.S. PATENT DOCUMENTS

| | | | |
|---|---|---|---|
| 4,861,637 | 8/1989 | Ueda et al. | 428/64.8 |
| 4,915,997 | 4/1990 | Yamamuro et al. | 428/65.2 |
| 5,011,723 | 4/1991 | Harigaya et al. | 428/64.5 |
| 5,024,927 | 6/1991 | Yamada et al. | 430/270.14 |
| 5,080,947 | 1/1992 | Yamada et al. | 428/64.4 |
| 5,100,700 | 3/1992 | Ide et al. | 428/64.6 |
| 5,213,947 | 5/1993 | Ueda et al. | 430/270.11 |
| 5,498,507 | 3/1996 | Handa et al. | 430/273.1 |
| 5,637,372 | 6/1997 | Tominaga et al. | 428/64.1 |
| 5,876,822 | 3/1999 | Zhou et al. | 428/64.1 |
| 5,891,542 | 4/1999 | Tominaga et al. | 428/64.1 |

FOREIGN PATENT DOCUMENTS

| | | |
|---|---|---|
| 0 735 158 A2 | 10/1996 | European Pat. Off. . |
| 0 813 189 A1 | 12/1997 | European Pat. Off. . |
| 42 17 279 A1 | 4/1993 | Germany . |
| 8-22644 | 1/1996 | Japan . |
| 8-216522 | 8/1996 | Japan . |
| 8-315418 | 11/1996 | Japan . |

*Primary Examiner*—Ali Neyzari
*Attorney, Agent, or Firm*—Oblon, Spivak, McClelland, Maier & Neustadt, P.C.

[57] ABSTRACT

An optical recording medium capable of recording and erasing information, includes a first dielectric layer, a recording layer, a second dielectric layer, a light reflection and heat dissipation layer, and an overcoat layer which are successively overlaid on a substrate, the recording layer including a phase-change recording material which includes as constituent elements Ag, In, Sb, Te, and N and/or O with the respective atomic % thereof being $\alpha$, $\beta$, $\gamma$, $\delta$ and $\epsilon$ (the total atomic % of N and/or O), which are in the relationship of: $0<\alpha\leq 6$, $3\leq\beta\leq 15$, $50\leq\gamma\leq 65$, $20\leq\delta\leq 35$, $0\leq\epsilon\leq 5$, provided that $\alpha+\beta+\gamma+\delta+\epsilon=100$, and (2) having a recrystallization upper-limit linear speed in a range of 2.5 to 5.0 m/s. A recording method and a reproduction method, using this optical recording medium, are proposed.

11 Claims, 9 Drawing Sheets

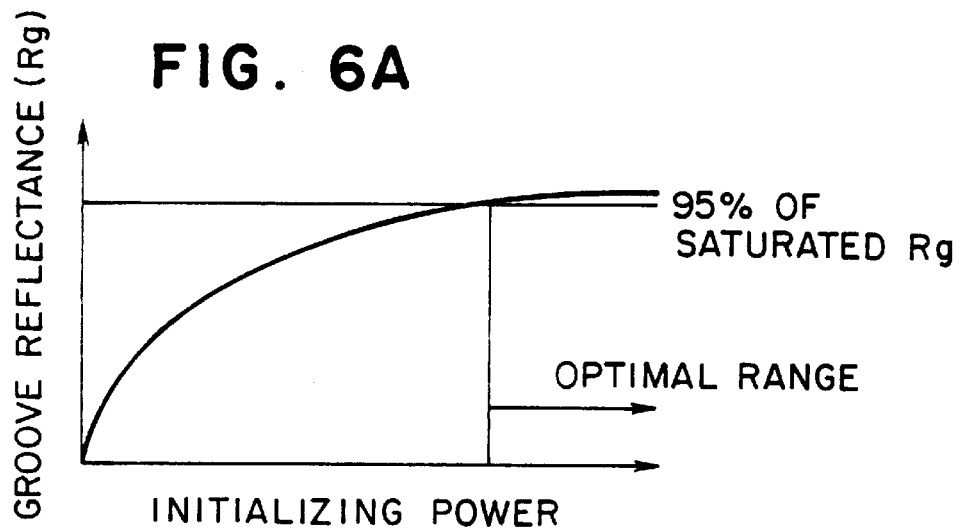
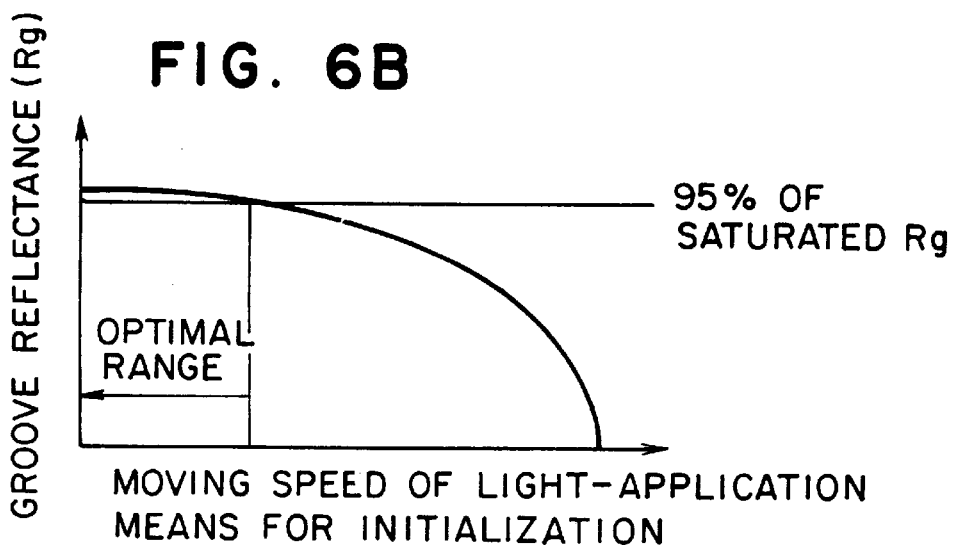
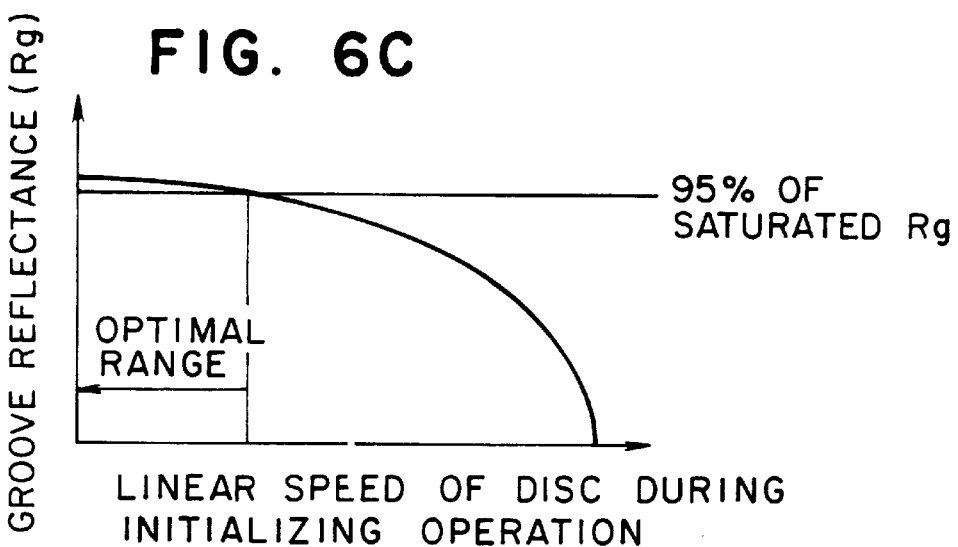

OPTICAL RECORDING MEDIUM AND RECORDING AND REPRODUCING METHOD USING THE SAME

BACKGROUND OF THE INVENTION

1. Field of the Invention

The present invention relates to an optical recording medium, in particular, a phase-change optical recording medium comprising a recording material capable of causing changes in the phase thereof by the application of a light beam thereto, thereby recording, reproducing and overwriting information therein; and a recording and reproducing method using the above-mentioned phase-change optical recording medium, which is applicable to optical memory devices, particularly, rewritable compact disc (hereinafter referred to as CD-rewritable or CD-RW).

2. Discussion of Background

There is conventionally known a phase-change optical recording medium which utilizes phase changes between a crystalline phase and an amorphous phase or between one crystalline phase and another crystalline phase as one of the optical recording media which are capable of recording, reproducing and erasing information by the application thereto of electro-magnetic waves, such as a laser beam. This kind of phase-change optical recording medium enables the overwriting of information by the application of a single laser beam thereto, although it is difficult to perform such overwriting operation, using magneto-optical memory. An optical system of a drive unit for the phase-change optical recording medium is simpler in mechanism than that for the magneto-optical recording medium, so that research and development of recording media of this kind has been actively conducted in recent years.

As disclosed in U.S. Pat. No. 3,530,441, so-called chalcogen-based alloys, such as Ge—Te, Ge—Te—Sn, Ge—Te—S, Ge—Se—S, Ge—Se—Sb, Ge—As—Se, In—Te, Se—Te and Se—As, are conventionally used as recording materials for the phase-change optical recording media. In addition, it is proposed to add Au to the above-mentioned Ge—Te based alloy to improve the stability of the recording material and also to increase the crystallization rate thereof as disclosed in Japanese Laid-Open Patent Application 61-219692. Furthermore, the addition of Sn and Au to the Ge—Te based alloy, and the addition of Pd to the same are respectively proposed in Japanese Laid-Open Patent Applications 61-270190 and 62-19490 for the same purposes as mentioned above. Furthermore, a recording material comprising a Ge—Te—Se—Sb alloy with a specific composition, and a recording material comprising an Ge—Te—Sb alloy with a specific composition are respectively disclosed in Japanese Laid-Open Patent Applications 62-73438 and 63-228433 for improvement of the recording and erasing repetition properties of a recording medium comprising each recording material.

However, not all the properties required for the phase-change rewritable optical recording medium are satisfied by the above-mentioned conventional phase-change optical recording media. In particular, as the most important targets to be reached, the improvement of recording sensitivity and erasing sensitivity, the prevention of the reduction of erasing ratio at overwriting, and the extension of the life of recorded and unrecorded portions are not yet reached by the above-mentioned conventional phase-change optical recording media.

In Japanese Laid-Open Patent Application 63-251290, there is proposed an optical information recording medium which is provided with a recording layer comprising a single layer of a compound of a multi-component system composed of substantially three or more components in a crystalline state. It is asserted that the single layer of the compound of a multi-component system composed of substantially three or more components contains a compound composed of three or more components with a stoichiometric composition, for example, $In_3SbTe_2$, in an amount of 90 atom % or more in the recording layer. It is furthermore asserted that recording and erasing characteristics can be improved by using this kind of recording layer. However, this optical information recording medium has the shortcomings that the erasing ratio is small and that the laser power required for recording and erasing is not sufficiently reduced.

Furthermore, Japanese Laid-Open Patent Application 1-277338 discloses an optical recording medium which comprises a recording layer comprising an alloy with a composition represented by the formula of $(Sb_aTe_{1-a})_{1-b}M_b$, wherein $0.4 \leq a \leq 0.7$, $b \leq 0.2$, and M is one element selected from the group consisting of Ag, Al, As, Au, Bi, Cu, Ga, Ge, In, Pb, Pt, Se, Si, Sn and Zn. In this reference, it is asserted that a basic system of the above-mentioned alloy is $Sb_2Te_3$, and that the addition of Sb to this alloy in an excessive amount in terms of atomic percentage makes it possible to attain high-speed erasing operation and improve the repetition properties, and that the addition of the element M can further enhance the high-speed erasing performance. In addition to the above advantages, this reference asserts that an erasing ratio obtained by the application of DC light is large. However, this reference does not show any specific erasing ratio at overwriting operation, and according to the experiments conducted by the inventors of the present invention, non-erased portions were observed in the course of the overwriting operation and the recording sensitivity obtained was insufficient for use in practice.

Japanese Laid-Open Patent Application 60-177446 discloses an optical recording medium which comprises a recording layer comprising an alloy with a composition represented by formula of $(In_{1-x}Sb_x)_{1-y}M_y$, wherein $0.55 \leq x \leq 0.80$, $0 \leq y \leq 0.20$, and M is one element selected from the group consisting of Au, Ag, Cu, Pd, Pt, Al, Si, Ge, Ga, Sn, Te, Se and Bi. In addition, Japanese Laid-Open Patent Application 63-228433 discloses a recording layer of an optical recording medium, which comprises an alloy with a composition of GeTe—$Sb_2Te_3$—Sb (excess). The recording sensitivity and erasability required for the recording medium cannot be satisfied by any of the above-mentioned conventional optical recording media.

In addition, Japanese Laid-Open Patent Application 4-163839 discloses an optical recording medium provided with a recording layer comprising a Te—Ge—Sb alloy, with the addition thereto of nitrogen atom; Japanese Laid-Open Patent Application 4-52188 discloses an optical recording medium provided with a recording layer comprising a Te—Ge—Se alloy, with at least one element of Te, Ge or Se being a nitride; and Japanese Laid-Open Patent Application 4-52189 discloses an optical recording medium provided with a recording layer comprising a Te—Ge—Se alloy, with nitrogen atom being adsorbed thereby.

These conventional optical recording media do not have sufficient characteristics for use in practice, in carticular, with respect to the improvement of recording sensitivity and erasing sensitivity, the prevention of the reduction of erasing ratio at overwriting, and the extension of the life of recorded and unrecorded portions.

With the rapid spread of compact discs (CD), write-once compact discs (CD-R) capable of writing data therein only once have been developed and placed on the market. In the case of the write-once compact discs (CD-R), however, once erroneous data is written in the CD-R, the written data cannot be corrected, so that it cannot help discarding the CD-R. Under such circumstances, there has been a demand for a rewritable compact disc that can be used in practice.

As one example of the above-mentioned rewritable compact discs, a magneto-optical recording medium has been developed, but has the shortcomings that overwriting operation is difficult to perform, and that the compatibility with CD-ROM or CD-R is poor. Under such circumstances, researches have been actively made for development of a practically usable phase-change optical recording disc which can ensure, in principle, the compatibility with the CD-ROM or CD-R.

Research and development activities for such a rewritable compact disc, using the phase-change optical recording medium, are reported, for example, in the following references: "Proceedings of the 4th Symposium on Phase-Change Recording" p.70 (1992), Furuya et al.; "Proceedings of the 4th Symposium on Phase-Change Recording" P.76 (1992), Jinno et al.; "Proceedings of the 4th Symposium on Phase-Change Recording" p.82 (1992), Kawanishi et al.; Jpn. J. Appl. Phys. 32 (1993) p.5226, T. Handa et al.; "Proceedings of the 5th Symposium on Phase-Change Recording" p.9 (1993), Yoneda et al.; and "Proceedings of the 5th Symposium on Phase-Change Recording" p.5 (1993), Tominaga et al. However, the overall performance of the rewritable compact discs reported in these references is satisfactory, for instance, in view of the drawbacks with respect to the compatibilities with CD-ROM and CD-R, recording and erasing performance, recording sensitivity, permissible repetition number of overwriting operations, permissible repetition number of reproducing operations, and shelf stability. These drawbacks are mainly ascribed to low erasability caused by the composition and structure of a recording material employed in each compact disc.

Under such present circumstances, there is increasingly demanded for development of a phase-change recording material with high erasability and high recording and erasing sensitivities, and also for development of a phase-change rewritable compact disc with excellent overall performance.

To meet this demand, the inventors of the present invention have discovered and proposed Ag—In—Sb—Te based recording materials, for example, as disclosed in Japanese Laid-Open Patent Applications 4-78031 and 4-123551; Jpn. J. Appl. Phys. 31 (1992) 461, H. Iwasaki et al.; "Proceedings of the 3rd Symposium on Phase-Change Recording" p.102 (1991), Ide et al.; and Jpn. J. Appl. Phys. 32 (1993) 5241, H. Iwasaki et al.

In October of 1996, "Compact Disc Rewritable PART III: CD-RW Version 1.0", which is generally called "Orange Book", was issued as the standards for the rewritable compact disc (CD-RW).

Furthermore, special attention has been paid to a digital video disc (DVD) and a DVD-RAM as the major optical recording media for the coming century. As a matter of course, the aforementioned rewritable compact disc is required to have reproduction compatibility with the DVD. However, recording signals of the conventional CD-RW do not exhibit any sufficient reflectance and modulation degree near a wavelength of 650 nm which corresponds to a reproduction wavelength of the DVD, so that the conventional CD-RW do not have sufficient signal characteristics for use in practice.

The above-mentioned standard book "Compact Disc Rewritable PART III: CD-RW Version 1.0" describes the standards for the rewritable compact disc for 2× nominal CD speed (2.4 to 2.8 m/s). However, a long recording time is required at such a low linear speed, so that a demand for a rewritable compact disc capable of performing high speed recording has been increased.

In accordance with the development of the CD-RW, drive systems for the CD-RW have also been actively developed, and matching tests between the CD-RW and the drive systems therefor have been made. The results of such matching tests indicate that in some drive systems, errors increasingly occur at the reproduction at 6× nominal CD speed or more (7.2 m/s or more), so that it has been confirmed that such high linear speed reproduction is difficult to perform by such drive systems. Furthermore, it is confirmed that in some drive systems, an optimum recording light power for the CD-RW cannot be determined by an "Optimum Power Control procedure" (hereinafter referred to as OPC procedure) which is defined in the aforementioned "Compact Disc Rewritable PART III: CD-RW Version 1.0".

The phase-change optical recording medium such as the CD-RW is initialized in the course of the manufacturing thereof, with a recording layer of the recording medium being crystallized, using an initializing apparatus. The initialized state of the recording layer has a significantly sensitive effect on the overwriting performance of the recording medium. The initialized state also significantly depends upon the initializing apparatus employed. In order to control the initialized state of each recording medium, it is necessary that the initializing apparatus be traced and identified with each recording medium. However, a system for performing such trace control has not yet been developed.

CD-RW is handled with the hand, so that dirt such as oil and dust may be deposited on the front and back surfaces of the disc. If this takes place, a cloth will be usually used to wipe the surfaces of the disc. are covered with dirt such as oil and dust. However, since a standard substrate of the disc is made of polycarbonate, if the surface of such a polycarbonate substrate is wiped to remove such dirt therefrom with a cloth, the surface of the substrate of the CD-RW is scratched, and there is a risk that recording and reproduction cannot be performed any longer due to the scratches formed on the surface of the substrate. To avoid such a problem, it is proposed to provide a hard coat layer such as an ultraviolet-curing resin layer on a non-grooved surface of the substrate, that is, a mirror surface of the substrate. Such a UV-curing resin layer has already been used in the magneto-optical recording disc. However, the coating of the UV-curing resin needs an extremely delicate coating technique, starting from a predetermined position in an extremely narrow area from a molding mark formed on the substrate by injection molding to an innermost groove edge on the substrate. Such delicate coating technique has not ever been applied to the fabrication of a commercially available phase-change optical recording medium. This is because uneven coating of the hard coat layer, no matter how the unevenness is slight, inevitably causes improper initialization of the recording medium.

Generally, the innermost groove edge is concentrically located at a distance of 22 mm from the center of the disc in the optical recording disc such as CD-RW, while in the magneto-optical recording disc, the innermost groove edge is located at a distance of 25 mm or more from the center thereof, so that the innermost groove edge of the optical recording disc is closer by 2 mm or more to the injection molding mark of the substrate than the innermost groove edge of the magneto-optical recording disc. Therefore, in the case of the phase-change optical recording disc, it is extremely difficult to provide the UV-curing resin layer on the substrate thereof with stable reproducibility.

A phase-change optical disc comprising an Ag—In—Sb—Te based recording layer is conventionally known to exhibit excellent recording performance. However, a phase-change optical recording disc which can securely ensure the compatibility with the CD-R, and satisfy the above-mentioned overall performance required for the rewritable compact disc has not yet been provided.

SUMMARY OF THE INVENTION

Accordingly, a first object of the present invention is to provide a phase-change optical recording medium free from the above-mentioned conventional drawbacks, which can be easily handled, and exhibit complete reproduction compatibility with the DVD, and excellent overall characteristics in a linear speed range of 1.2 to 5.6 m/s.

A second object of the present invention is to provide a phase-change optical recording medium which is capable of performing high speed reproduction with complete reproduction compatibility with the DVD.

A third object of the present invention is to provide a phase-change optical recording medium which does not perform erroneous operation even when an optimum recording power for the medium cannot be found.

A fourth object of the present invention is to provide a phase-change optical recording medium with an accurate optimum recording power, a minimum variation in the reflectivity caused by overwriting, stable tracking by a pickup device, complete reproduction compatibility with the DVD, and excellent overall characteristics in a linear speed range of 1.2 to 5.6 m/s.

A fifth object of the present invention is to provide a phase-change optical recording medium with excellent traceability of an initializing apparatus used to initialize the recording medium in order to facilitate the control of the initialization.

A sixth object of the present invention is to provide a phase-change optical recording medium with excellent traceability of an initializing apparatus used to initialize the recording medium in order to facilitate the control of the initialization, without the necessity for a large scale modification of the initializing apparatus and additional cost in the course of the control of the initialization, and with complete reproduction compatibility with the DVD, and excellent overall characteristics in a linear speed range of 1.2 to 5.6 m/s.

A seventh object of the present invention is to provide a phase-change optical recording medium with a hard coat layer which can be stably manufactured with an improved yield, which is resistant to scratches, and with complete reproduction compatibility with the DVD, and excellent overall characteristics in a linear speed range of 1.2 to 5.6 m/s.

An eighth object of the present invention is to provide a phase-change optical recording medium which can be used in both a 2× nominal CD speed mode and a 4× nominal CD speed mode.

A ninth object of the present invention is to provide a phase-change optical recording medium capable of high speed reproduction.

The first object of the present invention can be achieved by an optical recording medium capable of recording and erasing information, comprising: a substrate, a first dielectric layer, a recording layer, a second dielectric layer, a light reflection and heat dissipation layer, and an overcoat layer, the first dielectric layer, the recording layer, the second dielectric layer, the light reflection and heat dissipation layer, and the overcoat layer being successively overlaid on the substrate, the recording layer (1) comprising a phase-change recording material which comprises as constituent elements Ag, In, Sb, Te, and N and/or O with the respective atomic % thereof being $\alpha$, $\beta$, $\gamma$, $\delta$ and $\epsilon$ (the total atomic % of N and/or O), which are in the relationship of:

$0 < \alpha \leq 6$,
$3 \leq \beta \leq 15$,
$50 \leq \gamma \leq 65$,
$20 \leq \delta \leq 35$,
$0 \leq \epsilon \leq 5$, provided that $\alpha + \beta + \gamma + \delta + \epsilon = 100$, and (2) having a recrystallization upper-limit linear speed in a range of 2.5 to 5.0 m/s.

The second object of the present invention can be achieved by the above-mentioned optical recording medium in which the recording medium has a groove reflectance of 0.18 or more with respect to both of a reproduction light having a wavelength of 780 ±15 nm and a reproduction light having a wavelength of 640 ±15 nm.

The third object of the present invention can be achieved by the above-mentioned optical recording medium in which the substrate bears an Absolute Time in Pre-groove data (ATIP data) including a predetermined optimum recording power for the optical recording medium.

The fourth object of the present invention can be achieved by the above-mentioned optical recording medium in which the recording layer has a groove reflectance of 95% or more of a saturated groove reflectance thereof when the phase-change recording material is crystallized for initialization of the recording medium.

The fifth object of the present invention can be achieved by the above-mentioned optical recording medium in which the recording layer carries thereon an identification information for identifying an initializing apparatus used to initialize the recording medium, using an initialization light having a predetermined initializing power.

The sixth object of the present invention can be achieved by the above-mentioned optical recording medium in which the identification information is written in the form of a mark on a non-grooved surface of the substrate, using a light beam which is obtained by modulating the initializing power of the initialization light.

The seventh object of the present invention can be achieved by the above-mentioned optical recording medium which further comprises a hard coat layer which is provided on a non-grooved surface of the substrate, opposite to the first dielectric layer with respect to the substrate.

In the above-mentioned optical recording medium, it is preferable that the hard coat layer have a thickness of 2 to 6 μm and a pencil hardness of H or more.

Further, in the above-mentioned optical recording medium, it is preferable that the hard coat layer comprise a cured UV-curing resin which has a viscosity of 40 cps or more at room temperature before cured.

The eighth object of the present invention can be achieved by a method of recording information in a phase-change optical recording medium capable of recording information at a linear speed in a range of 2.4 to 5.6 m/s, and erasing recorded information therefrom, and as the phase-change optical recording medium, the above-mentioned optical recording medium of the present invention can be employed.

The ninth object of the present invention can be achieved by a method of reproducing information recorded in a phase-change optical recording medium capable of reproducing recorded information therefrom by controlling a reproduction light power of a reproduction light for reproducing recorded information in accordance with a reproduction linear speed, and as the phase-change optical recording medium, the above-mentioned optical recording medium of the present invention can be employed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6A is a graph showing the relationship between a light power for initializing a recording medium and a groove reflectance thereof.

FIG. 6B is a graph showing the relationship between a moving speed of a light-application means over a recording medium during an initializing step and a groove reflectance thereof.

FIG. 6C is a graph showing the relationship between a linear speed of a recording medium during the initializing step and the groove reflectance thereof.

DESCRIPTION OF THE PREFERRED EMBODIMENTS

The optical recording medium of the present invention comprises a substrate on which a first dielectric layer, a recording layer, a second dielectric layer, a light reflection and heat dissipation layer, and an overcoat layer are successively overlaid, with the recording layer (1) comprising a phase-change recording material which comprises as constituent elements Ag, In, Sb, Te, and nitrogen atom and/or oxygen atom with the respective atomic % thereof being $\alpha$, $\beta$, $\gamma$, $\delta$ and $\epsilon$ (the total atomic % of the nitrogen atom and/or oxygen atom), which are in the relationship of:

$0<\alpha\leqq6$,
$3\leqq\beta\leqq15$,
$50\leqq\gamma\leqq65$,
$20\leqq\delta\leqq35$,
$0\leqq\epsilon\leqq5$, provided that $\alpha+\beta+\gamma+\delta+\epsilon=100$, and (2) having a recrystallization upper-limit linear speed in a range of 2.5 to 5.0 m/s.

The above-mentioned "recrystallization upper-limit linear speed" of the recording layer of the optical recording medium of the present invention means an upper limit linear speed of a light beam which scans the recording layer at which the recording layer can be recrystallized after being fused with the application of the light beam thereto, and then cooled and recrystallized.

In the above, as the light beam is used a semiconductor laser beam which is similar to that of a semiconductor laser mounted in a writer for the recording medium.

The above-mentioned "recrystallization upper-limit linear speed" of the recording layer of the optical recording medium is a novel value for characterizing the recording medium, which was discovered by the inventors of the present invention.

The "recrystallization upper-limit linear speed" of the recording layer can be determined from the dependency of the reflectance of a groove portion or a land portion of the recording layer of the optical recording medium on the linear speed of the recording medium under the exposure to the light beam, or upon the linear speed of the light beam which scans the recording layer.

Figure 9:
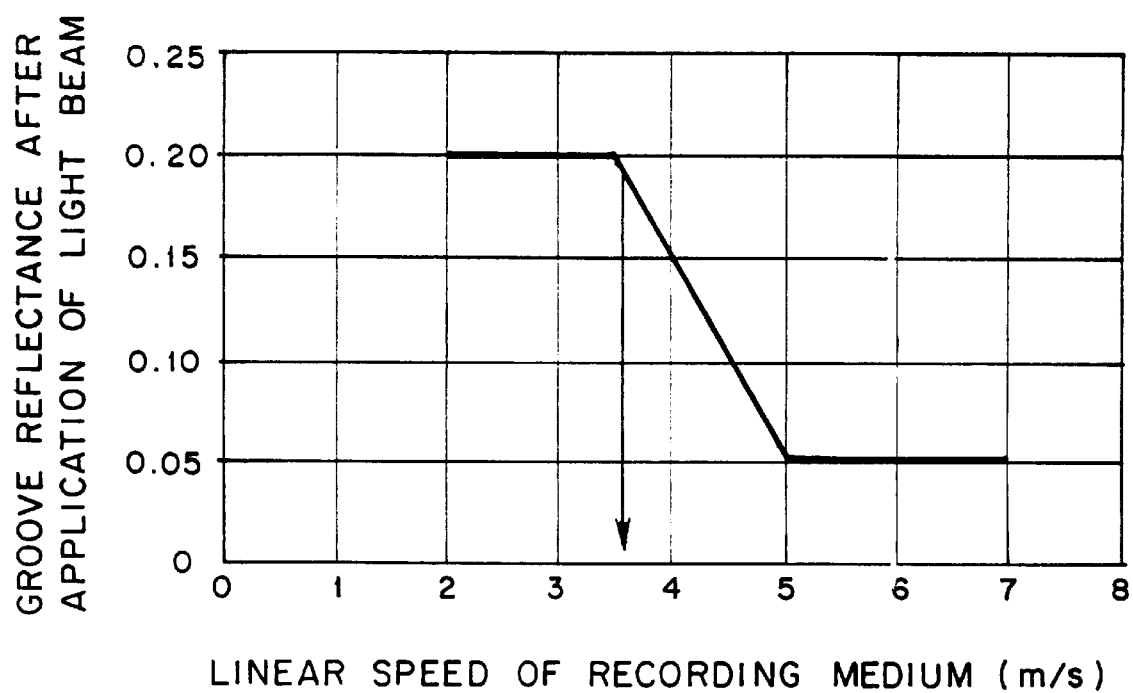
FIG. 9 is a graph showing the relationship between the linear speed of a phase-change optical recording disc at the application of a light beam thereto and the groove reflectance thereof after the application of the light beam.

FIG. 9 is a graph which shows the relationship between (a) the linear speed of a phase-change optical recording disc in the course of scanning of a light beam over a recording layer of the phase-change optical recording disc and (b) the reflectance of a groove of the recording disc irradiated with the light beam. As shown in FIG. 9, in the course of increasing the linear speed of the optical recording medium, the reflectance of the groove begins to suddenly drop at a certain linear speed. This linear speed is defined as the above-mentioned "recrystallization upper-limit linear speed" of the recording layer. In FIG. 9, the "recrystallization upper-limit linear speed" of the recording layer is 3.5 m/s.

Even though the wavelength of the light beam scanning the recording medium is the same, the "recrystallization upper-limit linear speed" of the recording layer slightly varies depending on the power and the diameter of the light beam employed. For instance, when a laser beam with a wavelength of 780 nm is applied, using a pickup tube with a numerical aperture (NA) of 0.5, to a phase-change optical recording disc, a maximum variation of the "recrystallization upper-limit linear speed" of the recording layer is about ±0.5 m/s.

The performance of the phase-change optical recording medium depends upon the "recrystallization upper-limit linear speed" of the recording layer.

When the "recrystallization upper-limit linear speed" of the recording layer is less than 2.5 m/s, the phase-change optical recording medium is not suitable for use in practice, since the recrystallization of the recording layer cannot be carried out at high linear speed, so that too much time is required to initialize the recording medium. Furthermore, when recording is performed in such recording medium at 4× nominal CD speed, the erasing operation cannot be perfectly carried out. On the other hand, when the "recrystallization upper-limit linear speed" of the recording layer exceeds 5.0 m/s, the recording layer cannot assume a complete amorphous state when information is written therein. Thus, satisfactory signal properties cannot be obtained.

To control the "recrystallization upper-limit linear speed" of the recording layer as specified in the present invention, it is preferable that the phase-change optical recording medium be produced in such a manner that the temperature of the substrate is set at 80° C. or less when the first dielectric layer, the recording layer, the second dielectric layer, the light reflection and heat dissipation layer and the overcoat layer are successively overlaid on the substrate in this order. When the temperature of the substrate exceeds 80° C., the dielectric layer and/or the recording layer is partially crystallized in the course of formation thereof, so that the desired "recrystallization upper-limit linear speed" of the recording layer cannot be obtained, or it becomes difficult to find the linear speed at which the groove reflectance suddenly drops as illustrated in FIG. 9.

Furthermore, the film-forming speed for the recording layer affects the "recrystallization upper-limit linear speed" of the recording layer, although its mechanism is unknown. As the film-forming speed for the recording layer is decreased, the "recrystallization upper-limit linear speed" of the recording layer is decreased. In order to obtain the desired "recrystallization upper-limit linear speed" of the recording layer, it is preferable that the film-forming speed for the recording layer be adjusted to 2 to 30 nm/s. When the film-forming speed for the recording layer is less than 2 nm/s, the "recrystallization upper-limit linear speed" of the recording layer is decreased to less than 2 m/s, while when the film-forming speed for the recording layer is more than 30 nm/s, the "recrystallization upper-limit linear speed" of the recording layer exceeds 5 m/s.

When the recording layer is not sufficiently heated to a temperature higher than the melting point thereof by the application of a light beam thereto, or when the recrystallization takes place too quickly after the recording layer is fused, there is a case where it is difficult to find the linear speed at which the groove reflectance suddenly drops as shown in FIG. 9 although the composition of the recording layer is the same as that specified in the present invention.

Figure 1:
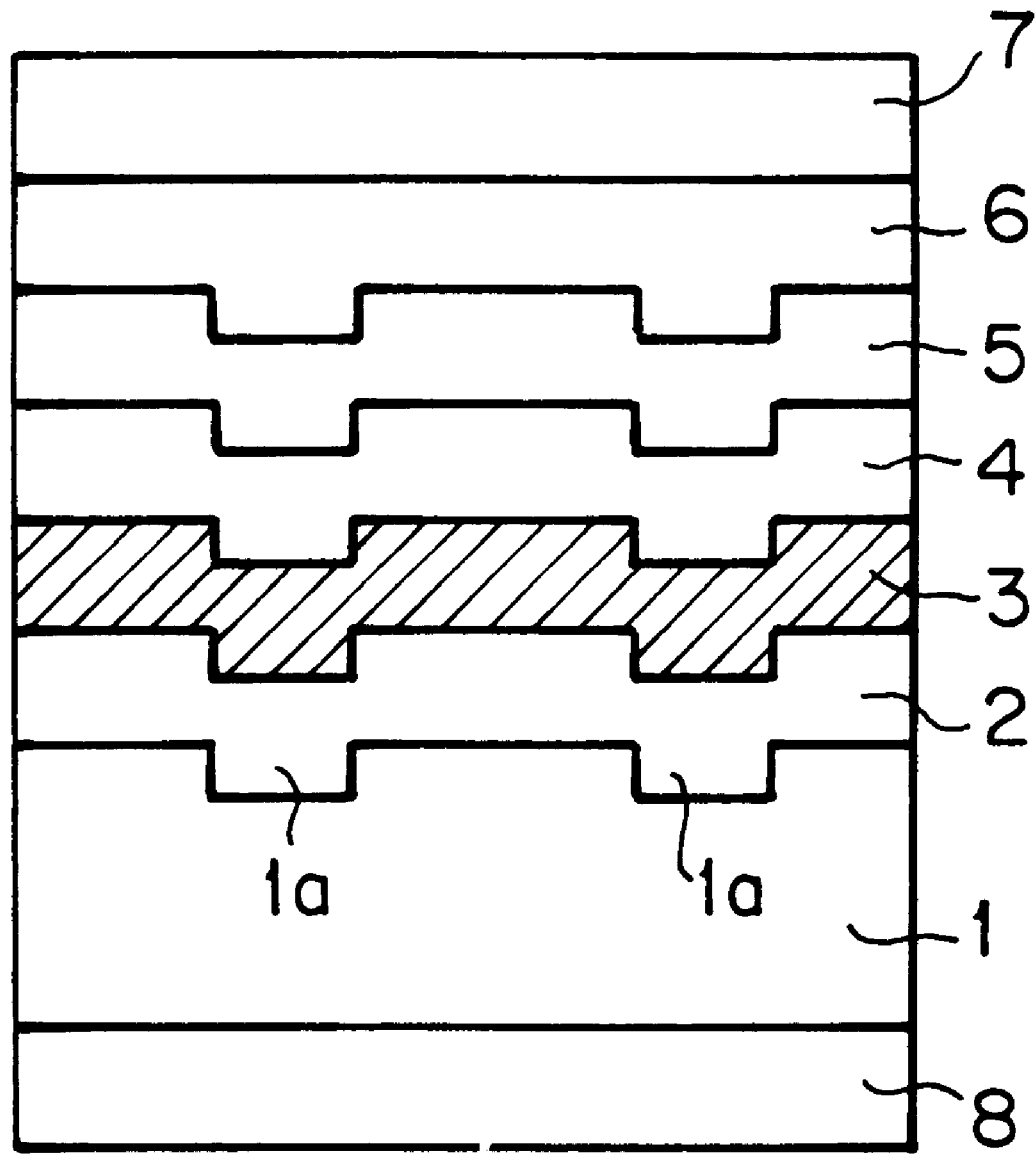
FIG. 1 is a schematic cross-sectional view of an example of a phase-change optical recording medium of the present invention.

FIG. 1 shows a schematic cross-sectional view of an example of the phase-change optical recording medium according to the present invention. On a substrate 1 with guide grooves 1a, there are successively overlaid a first dielectric layer 2, a recording layer 3, a second dielectric layer 4, a light reflection and heat dissipation layer 5, and an overcoat layer 6. Further, as shown in FIG. 1, a printing layer 7 may be overlaid on the overcoat layer 6, and a hard coat layer 8 may also be provided on a non-grooved side of the substrate 1, opposite to the first dielectric layer 2 with respect to the substrate 1.

In the phase-change optical recording medium of the present invention, as the material for the substrate 1, glass, ceramic materials and resins can be used. In particular, the resin substrate is advantageous over other substrates from the viewpoints of manufacturing cost and molding facility.

Examples of the resin serving as the material for the substrate 1 include polycarbonate resin, acrylic resin, epoxy resin, polystyrene resin, acrylonitrile-styrene copolymer resin, polypropylene resin, silicone resin, fluoroplastics, ABS resin and urethane resin. Of these resins, polycarbonate resin and acrylic resin are preferably employed for the substrate 1 because of their easy processing properties, optical properties and the manufacturing cost. The substrate 1 may be prepared in the form of a disc, card or sheet.

When the phase-change optical recording medium of the present invention is applied to a rewritable compact disc (CD-RW), it is desirable that the substrate 1 have a guide groove with a width of 0.25 to 0.65 $\mu$m, preferably 0.30 to 0.55 $\mu$m, and a depth of 250 to 650 Å, preferably 300 to 550 Å.

There is no particular restriction to the thickness of the substrate 1, but it is preferable that the substrate have a thickness in the range of 1.2 mm or 0.6 mm.

As the phase-change recording material for the recording layer 3, a material of a quaternary system of Ag—In—Sb—Te is preferable, whereby the optical recording medium of the present invention is caused to exhibit high recording sensitivity and speed, that is, excellent phase change performance from a crystalline phase to an amorphous phase; high erasing sensitivity and speed, that is, excellent phase change performance from an amorphous phase to a crystalline phase; and high erasability.

The Ag—In—Sb—Te quaternary system has an optimum recording linear speed which depends upon the composition of the quaternary system. Therefore, it is necessary to appropriately adjust the composition of the quaternary system of Ag, In, Sb and Te in accordance with a desired recording linear speed and a desired linear speed range. It has been confirmed that in a recording medium with an Ag—In—Sb—Te recording layer, the composition ratio of Te in the recording layer is mutually related to the optimum recording linear speed of the recording medium.

Figure 2:
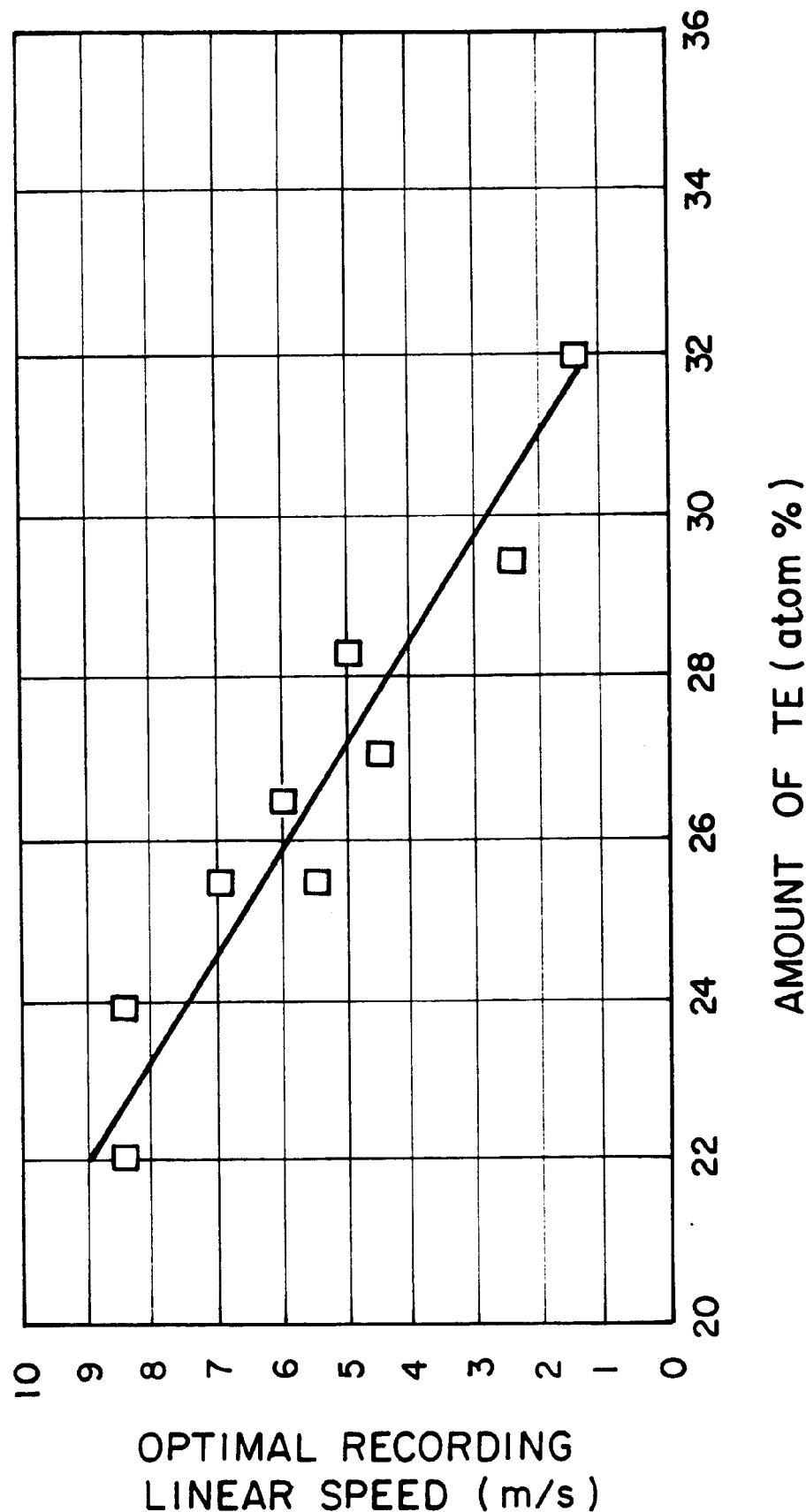
FIG. 2 is a graph showing the relationship between the atomic % of Te in a phase-change recording material of a quaternary system of Ag—In—Sb—Te in a recording layer and an optimal recording linear speed of a phase-change optical disc recording medium comprising the recording layer.

FIG. 2 is a graph showing the relationship between the atomic % of Te in a phase-change recording material of a quaternary system of Ag—In—Sb—Te in a recording layer and the optimal recording linear speed of a phase-change optical disc recording medium comprising the recording layer.

The phase-change optical disc recording medium has a similar layered structure to that shown in FIG. 1, provided that the printing layer 7 is not provided, namely, comprising a hard coat layer 8 having a thickness in a range of 3 to 5 $\mu$m, a substrate 1 having a thickness of 1.2 mm, a first dielectric layer 2 having a thickness of 100 nm, a Ag—In—Sb—Te recording layer 2 having a thickness of 25 nm, a second dielectric layer 4 having a thickness of 30 nm, a light reflection and heat dissipation layer 5 composed of a metal or an alloy having a thickness of 140 nm, and an overcoat layer 6 composed of a UV cured resin having a thickness of 8 to 10 $\mu$m.

Figure 3:
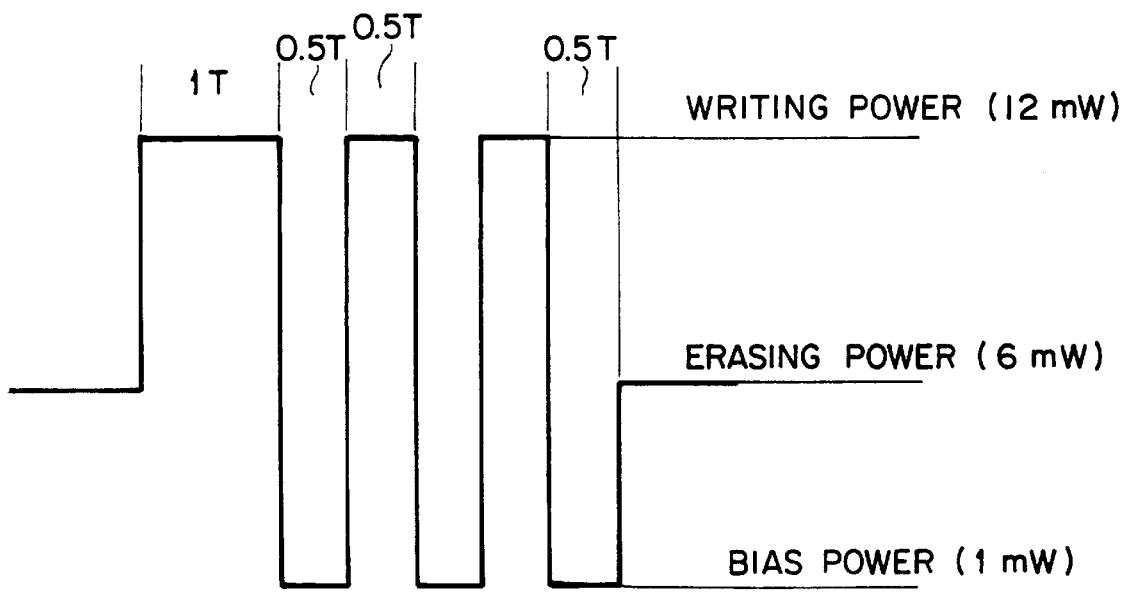
FIG. 3 is a strategy for 2× nominal CD speed in conformity to the "Compact Disc Rewritable PART III: CD-RW Version 1.0".

The recording was carried out by applying a light beam with a wavelength ($\lambda$) of 780 nm to the recording medium, with the numerical aperture value (NA) of a pickup tube being set at 0.5, with an Eight to Fourteen Modulation (EFM) system, and the recording pulse was determined, as shown in FIG. 3, in accordance with the strategy as specified in the "Compact Disc Rewritable PART III". The recording light power, the erase light power, and the bias power were respectively set at 12 mW, 6 mW and 1 mW. The optimal recording linear speed is defined as a linear speed at which a maximum permissible repetition number of overwriting operations can be attained.

As shown in the graph in FIG. 2, there is a high correlation between the optimal recording linear speed of the recording medium and the composition ratio of Te (atomic % of Te) in the Ag—In—Sb—Te recording layer 2 with a coefficient of correlation ($R^2$) of 0.9133. When the above results and an experimental error of ±1 atom. % taken into consideration in view of the graph in FIG. 2, it is considered that the atomic % of Te in the composition of the recording material is 35 atom. % or less, no matter how slow the recording linear speed is, that is, at 0 m/s. Furthermore, in order to obtain a phase-change optical recording disc which can cope with a linear speed of 1×, 2×, 4× and 8× nominal CD speed, the preferable atomic % of Te in the composition of the recording material is considered to be as follows:

TABLE 1

| Desired Linear Speed | Preferable Amount of Te (atom. %) |
| --- | --- |
| 1 × nominal CD speed (1.2 to 1.4 m/s) | about 33 |
| 2 × nominal CD speed (2.4 to 2.8 m/s) | about 30 |
| 4 × nominal CD speed (4.8 to 5.6 m/s) | about 27 |
| 8 × nominal CD speed (9.6 to 11.2 m/s) | about 20 |

In the Ag—In—Sb—Te based recording layer, the composition ratio of each element affects the preservation reliability of the obtained recording medium.

To be more specific, when the atomic % of the element Ag in the composition of the recording material exceeds 6 atom. %, the deterioration of the overwriting shelf properties becomes noticeable. Namely, sufficient signal recording cannot be performed in several years after the production of the recording medium.

When the atomic % of the element In exceeds 15 atom. %, the archival life is reduced, whereas when the atomic % thereof is less than 3 atom. %, the recording sensitivity is decreased.

With respect to the element Sb, the greater the atomic % thereof, the better the repetition performance of the overwriting operation. However, when the atomic % of the element Sb exceeds 65 atom. %, the archival life is decreased.

In order to prevent the reduction of the archival life, the addition of nitrogen and/or oxygen atom to the composition of the phase-change recording layer is very effective. By the addition of N and/or O to the composition of the recording layer, an amorphous mark can be stabilized. The mechanism of the above-mentioned improvement in such disc characteristics caused by the addition of a proper amount of nitrogen and/or oxygen to the composition of the recording layer has not yet been clarified, but it is considered that when a proper amount of nitrogen and/or oxygen is contained in the recording layer, the density of a recording layer is decreased and minute voids are increased in the recording layer, whereby the randomness of the recording layer is increased in terms of the configuration. As a result, the degree of order in the recording layer is moderated in comparison with the case where nitrogen and/or oxygen atom is not contained in the recording layer. Therefore, the transition from the amorphous phase to the crystalline phase can be restrained, so that the stability of the amorphous mark is increased and the shelf life of the amorphous mark is improved.

When nitrogen and/or oxygen is contained in the recording layer, it is conspicuously shown by an IR spectrum thereof that nitrogen and/or oxygen is bonded to Te and/or Sb in the composition of the recording layer.

According to the present invention, the total atomic % of N and/or O in the composition of the recording layer is 5 atom. % or less. When the total atomic % thereof exceeds 5 atom. %, the nitrogention of the recording layer excessively proceeds, so that the crystallization of the recording layer becomes difficult. As a result, the recording layer cannot be sufficiently initialized, and the erasability is reduced.

The nitrogen and/or oxygen can be introduced into the recording layer by containing nitrogen gas and/or oxygen gas with a concentration of more than 0 to 10 mol. % in the atmosphere of argon when the recording layer is formed by sputtering. By use of a mixed gas of N and/or O gas and argon gas in the course of the sputtering, N and/or O can be effectively introduced into the recording layer. The mixed gas for use in the sputtering step may be prepared by mixing the nitrogen and/or oxygen gas and the argon gas in a predetermined mixing ratio before the mixed gas is introduced into a sputter chamber. Alternatively, the argon gas and the nitrogen and/or oxygen gas are introduced into the sputter chamber with the respective flow rates being controlled so as to obtain a desired molar ratio.

Furthermore, one of the advantages obtained by the introduction of nitrogen and/or oxygen into the recording layer is that the recrystallization speed or rate of the recording layer can be retarded, whereby an optimum recrystallization speed of the recording layer can be controlled. In other words, the optimum recording linear speed of the phase-change optical recording disc can be controlled simply by adjusting the mixing ratio of nitrogen and/or oxygen gas/argon gas in the sputtering atmosphere for the formation of the recording layer by sputtering, even if the same target is used.

It is desirable that N and/or C be chemically bonded to at least one element of Ag, In, Sb or Te in the recording layer. In particular, when N and/or O is bonded to Te, for example, with the formation of a Te—N bond, a Te—O bond or a Sb—Te—N bond, the permissible repetition number of overwriting operations can be more effectively increased than the case where N and/or O is chemically bonded to any of the other elements. Such chemical bonding in the recording layer can be effectively analyzed by spectroscopic analysis such as Fourier transform infrared spectroscopic analysis (FT-IR) or X-ray photoelectron spectroscope (XPS). For instance, according to the FT-IR analysis, the Te—N bond exhibits peaks near 500 to 600 cm$^{-1}$; and the Sb—Te—N bond exhibits peaks near 600 to 650 cm$^{-1}$.

In the present invention, the recording layer for use in the phase-change optical recording medium may further comprise other elements and impurities for further improvement of the performance and the reliability thereof. For instance, such elements as B, N, C, P and Si, disclosed in Japanese Patent Application 4-1488, and other elements such as O, S, Se, Al, Ti, V, Mn, Fe, Co, Ni, Cr, Cu, Zn, Ga, Sn, Pd, Pt and Au may be contained as preferable elements or impurities in the recording layer.

In the present invention, the composition of the recording layer for use in the phase-change optical recording medium is analyzed, using the emission spectroscopic analysis. Not only the emission spectroscopic analysis, but also X-ray microanalysis, Rutherford back scattering, Auger electron spectroscopic analysis, and X-ray fluorescence analysis can be employed to analyze the composition of the recording layer. In such a case, however, it is necessary to compare the analyzed composition with the composition analyzed by the emission spectroscopic analysis. Generally, it is considered that there is an analytic error of ±5% when the composition is measured by the emission spectroscopic analysis. In addition to the above, mass spectrometric analysis, such as secondary ion mass spectrometric analysis is one of the effective methods of analyzing the composition of the recording layer.

The X-ray diffraction or electron diffraction is appropriate for analyzing the state of the material in the recording layer. Namely, when a spot pattern or a Debye-Scherrer ring pattern is observed in the recording layer by the electron diffraction, the material in the recording layer is considered be in a crystalline state, while when a ring pattern or a halo pattern is observed therein, the material in the recording layer is considered to be in an amorphous state.

The particle size of the crystallites in the recording layer can be determined, for instance, using the Scherrer equation, from a half width of a X-ray diffraction analysis peak.

Further, for the analysis of the chemical bonding state of the materials in the recording layer, for example, for the analysis of the chemical bonding state of the materials such as oxides or nitrides in the recording layer, analytical methods such as FT-IR and XPS are effective.

It is preferable that the thickness of the recording layer be in the range of 10 to 100 nm, more preferably in the range of 15 to 50 nm. When the thickness of the recording layer is less than 10 nm, the light absorbing performance of the recording layer tends to be decreased, while when the thickness is more than 100 nm, there is a tendency that uniform phase change is difficult to be carried out at high speed in the recording layer.

Furthermore, when initial properties such as jitter value, overwriting properties and mass production efficiency are taken into consideration, it is preferable that the thickness of the recording layer be in the range of 15 to 35 nm.

The above-mentioned recording layer can be formed by vacuum deposition, sputtering, plasma chemical vapor deposition, photochemical vapor deposition, ion plating or electron beam deposition method. Of these methods, the sputtering method is the most advantageous over other methods in terms of productivity and the film quality of the recording layer obtained.

The first and second dielectric layers 2 and 4 work as protective layers.

Specific examples of the material for use in the first and second dielectric layers 2 and 4 are metallic oxides such as SiO, $SiO_2$, ZnO, $SnO_2$, $Al_2O_3$, $TiO_2$, $In_2O_3$, MgO, and $ZrO_2$; nitrides such as $Si_3N_4$, AlN, TiN, BN and ZrN; sulfides such as ZnS, $In_2S_3$ and $TaS_4$; carbides such as SiC, TaC, $B_4C$, WC, TiC and ZrC; carbon with a diamond structure; and mixtures thereof. Further, those dielectric layers may further comprise an impurity when necessary, or each dielectric layer may be of a multiple-layered structure, provided that the melting points of the first and second dielectric layers 2 and 4 are required to be higher than that of the recording layer 3.

The first and second dielectric layers 2 and 4 for use in the present invention can be provided by vacuum deposition, sputtering, plasma chemical vapor deposition, photochemical vapor deposition, ion plating or electron beam deposition method. Of these methods, the sputtering method is the most advantageous over other methods in terms of the productivity and the film quality of the obtained layers.

When necessary, each of the first and second dielectric layers 2 and 4 may be of a multi-layered type.

The thickness of the first dielectric layer 2 has a significant effect on a groove reflectance of the light having a wavelength of 650 nm, which is for reproducing signals recorded in the DVD.

Figure 4:
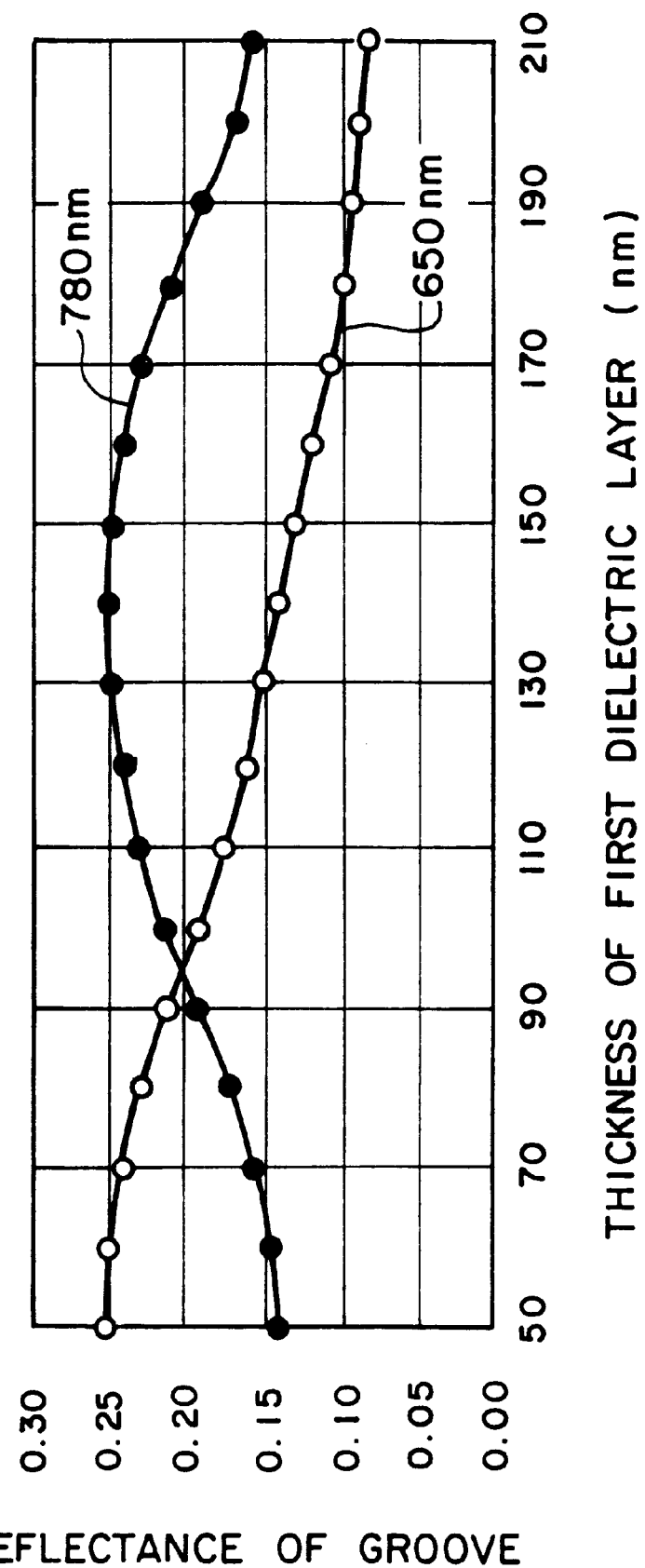
FIG. 4 is a graph which shows the relationship between the thickness of a first dielectric layer of a phase-change optical recording medium of the present invention and the reflectance of a groove portion thereof.

FIG. 4 is a graph which shows that, in a phase-change optical recording medium comprising a first dielectric layer with a refractive index of 2.0, a recording layer with a thickness of 25 nm, a second dielectric layer with a thickness of 30 nm and a refractive index of 2.0, and a light reflection and heat dissipation layer with a thickness of 140 nm, how the groove reflectance of the recording medium depends upon the thickness of the first dielectric layer.

With reference to FIG. 4, in order to obtain a groove reflectance of 0.15 to 0.25 which is standardized for CD-RW, using a reproduction beam with a wavelength of 780 nm and a reproduction beam with a wavelength of 650 nm, it is required that the thickness of the first dielectric layer 2 be adjusted within a range of 65 to 130 nm. Further, in order to obtain a groove reflectance of 0.18 or more which is considered sufficient for use in practice, using the reproduction beam with a wavelength of 650 nm, it is desirable to adjust the thickness of the first dielectric layer to 110 nm or less. Furthermore, in order to obtain the above-mentioned sufficient groove reflectance, using the reproduction beam with a wavelength of 780 nm, it is desirable to adjust the thickness of the first dielectric layer to 80 nm or more. In view of the above-mentioned analytical results, an optimum thickness of the first dielectric layer is considered to be in a range of 80 to 110 nm in order to obtain sufficient signal characteristics, using the reproduction beam with a wavelength of 650 nm and the reproduction beam with a wavelength of 780 nm.

It is preferable that the thickness of the second dielectric layer 4 be in the range of 15 to 45 nm, more preferably in the range of 20 to 40 nm. When the thickness of the second dielectric layer 4 is less than 15 nm, the second dielectric layer 4 does not always effectively work as a heat-resistant protective layer, and the recording sensitivity of the recording medium tends to be lowered, while when the thickness of the second dielectric layer 4 is more than 45 nm, the second dielectric layer 4 tends to be peeled off when used at a so-called low linear speed in the range of 1.2 to 5.6 m/s and accordingly the recording repetition performance tends to be lowered.

Specific examples of the material for the light reflection and heat dissipation layer 5 are metals such as Al, Au, Ag, Cu and Ta, and alloys thereof. The light reflection and heat dissipation layer 5 may further comprise other additional elements such as Cr, Ti, Si, Cu, Ag, Pd and Ta.

The light reflection and heat dissipation layer 5 can be provided by vacuum deposition, sputtering, plasma chemical vapor deposition, photochemical vapor deposition, ion-plating or electron beam deposition method.

It is preferable that the thickness of the light reflection and heat dissipation layer 5 be in the range of 70 to 180 nm, more preferably in the range of 100 to 160 nm.

It is also preferable that an overcoat layer 6 for preventing oxidation of the light reflection and heat dissipation layer 5 be provided on the light reflection and heat dissipation layer 5. As the overcoat layer 6, an ultraviolet-curing resin layer which is prepared by spin coating is in general use.

It is preferable that the thickness of the overcoat layer 6 be in the range of 7 to 15 $\mu$m. When the thickness is less than 7 $\mu$m, operation errors tend to occur increasingly when a printing layer 7 is overlaid on the overcoat layer 6, while when the thickness is more than 15 $\mu$m, the internal stress of the overcoat layer 6 increases, so that the overcoat layer 6 tends to have large adverse effects on the mechanical properties of the recording medium.

A hard coat layer 8 may be provided on the non-grooved side of the substrate 1. The hard coat layer 8 is generally formed by subjecting a UV-curing resin to spin coating.

It is preferable that the thickness of the hard coat layer 8 be in the range of 2 to 6 $\mu$m. When the thickness of the hard coat layer 8 is less than 2 $\mu$m, the scratch resistance thereof tends to be lowered, while when the thickness of the hard coat layer 8 is more than 6 $\mu$m, the internal stress of the hard coat layer 8 increases, so that the hard coat layer 8 tends to have large adverse effects on the mechanical properties of the recording medium.

It is preferable that the hard coat layer 8 have a pencil hardness of H or more with which pencil hardness, the surface of the hard coat layer 8 is seriously scratched even when rubbed with a cloth. When necessary, an electroconductive material may be contained in the hard coat layer 8 to make the hard coat layer 8 antistatic so as to effectively prevent dirt or the like from electrostatically adhering thereto.

Figure 5:
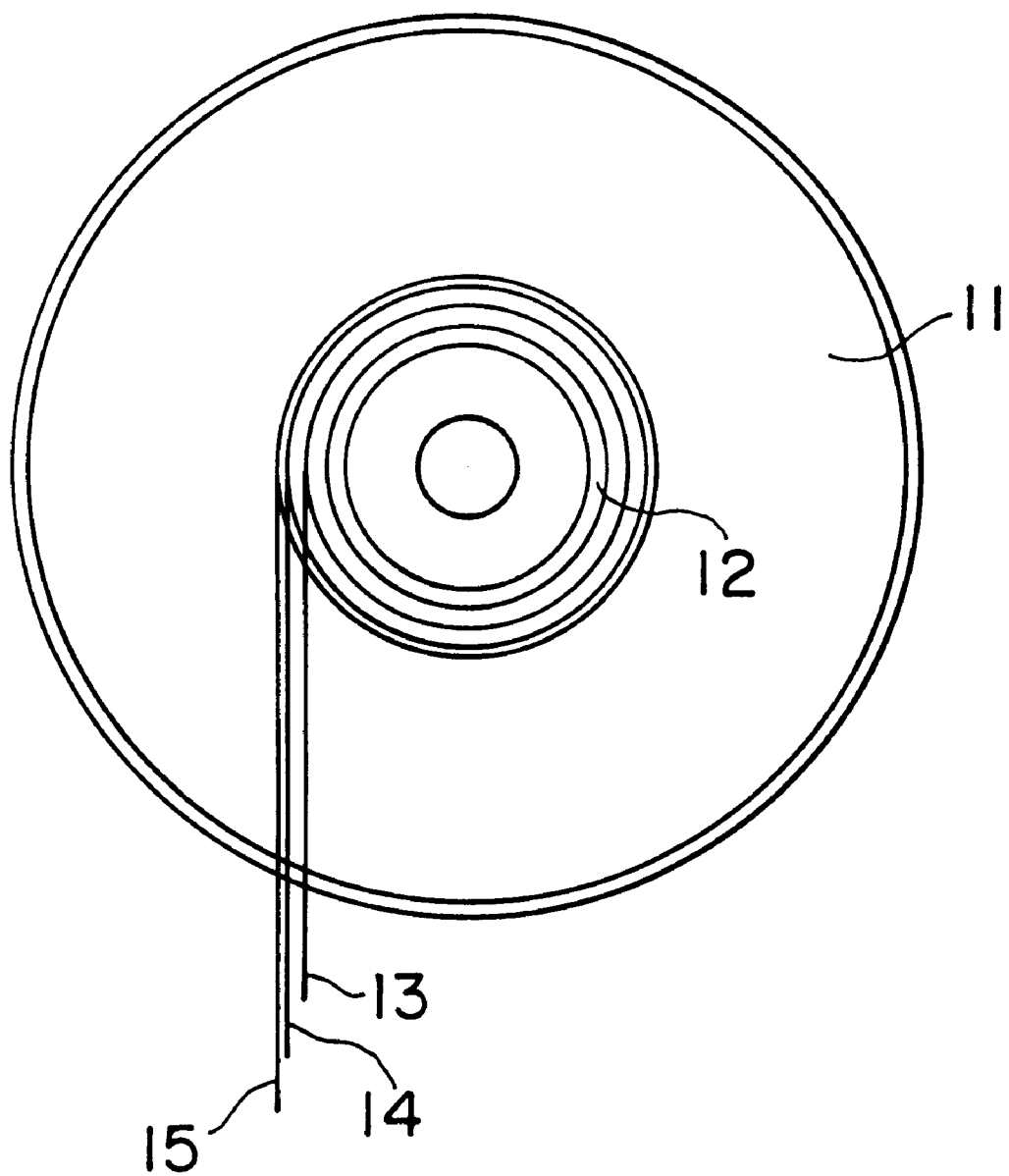
FIG. 5 is a schematic front view of a phase-change optical recording medium of the present invention in explanation of a coating starting position for the formation of a hard coat layer.

It is preferable that the UV-curing resin for use in the hard coat layer 8 have a viscosity of 40 cps or more at room temperature in order to control a coating position therefor with high precision and high reproducibility, whereby the edge of the hard coat layer 8 can be accurately positioned, for instance, within an area from a distance of 20 to 22 mm from the center of a disc as shown in FIG. 5.

FIG. 5 is a schematic front view of a phase-change optical recording disc of the present invention, viewed from a non-grooved side of a substrate thereof, in explanation of the coating area of the hard coat layer 8. As shown in FIG. 5, in the phase-change optical recording disc of the present invention, there are formed a stack ring 12, and an injection molding mark 13 which is concentrically formed at a distance of 20 mm from the center of the disc in the course of preparation of the substrate by injection molding.

Reference numeral 11 indicates a recording area. On the opposite side of the substrate there is provided a spiral groove 15 in the recording area 11, and the innermost edge of the spiral groove 15 is concentrically located at a distance of 22 mm from the center of the disc. In order to provide a hard coat layer 8 on the non-grooved side of the substrate 1, therefore, the spin coating of the UV-curing resin on the non-grooved side of the substrate 1 is required to start from a position in an area between the injection molding mark 13 and the innermost groove edge 15.

Further, as above explained, the initial crystalline state of the recording layer depends on the initializing apparatus employed in the course of the fabrication of the recording medium. Therefore, it is preferable to place a mark for recognizing which initializing apparatus is employed for initializing the recording medium on the substrate in the course of the initializing step. In this case, such a mark may be formed at an inner side of the innermost groove edge 15.

Figure 7:
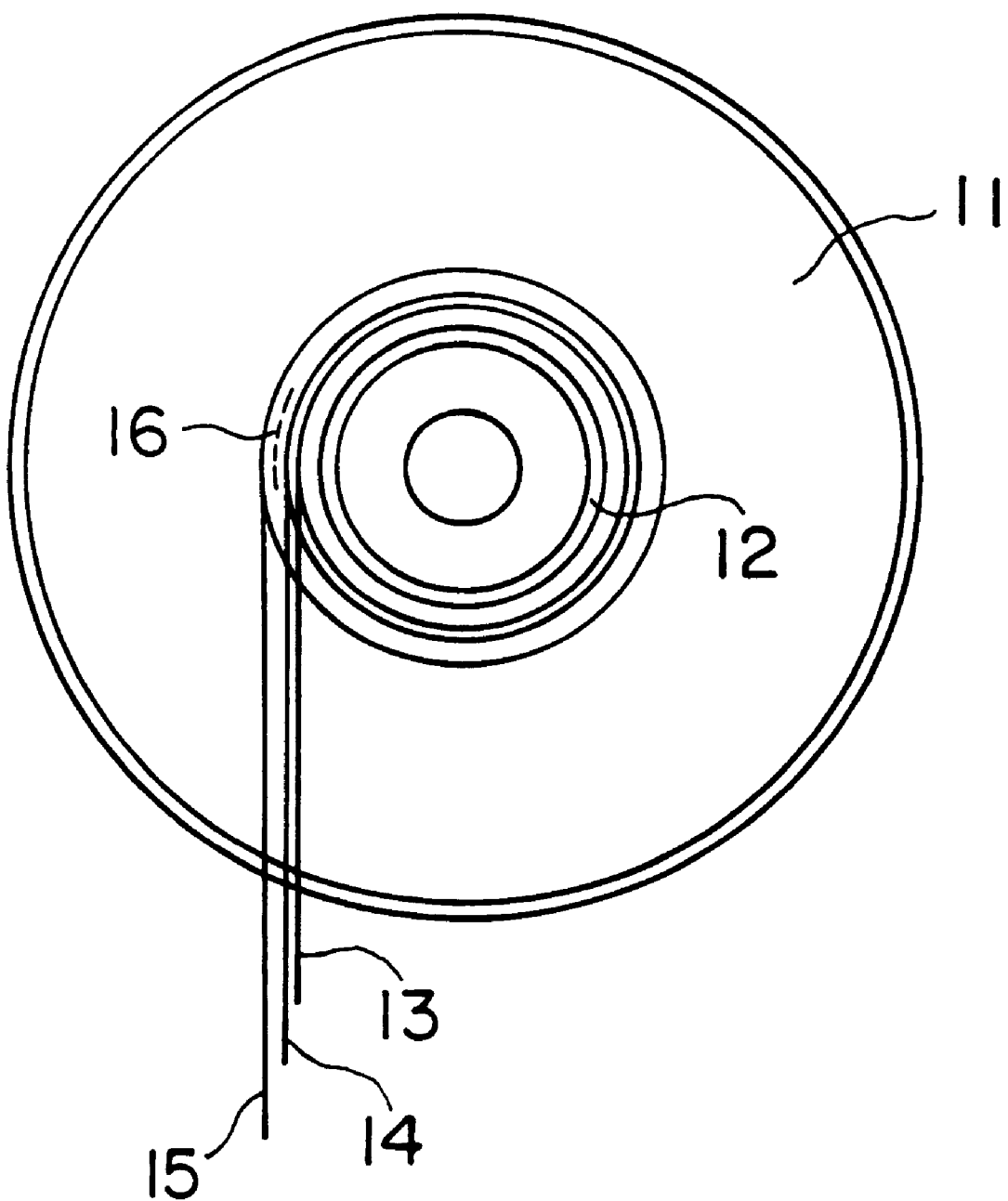
FIG. 7 is a schematic front view of a phase-change optical recording medium of the present invention in explanation of a mark for identifying an initializing apparatus employed at the initializing step.

FIG. 7 is a schematic front view of a phase-change optical recording medium of the present invention, viewed from the non-grooved side of the substrate, in explanation of the position of the mark for recognizing the initializing apparatus. As shown in FIG. 7, such a mark 16 is formed between the injection molding mark 13 and the innermost groove edge 15. In such a case, the starting position from which the spin coating of the UV-curing resin is initiated for the formation of the hard coat layer 8 is required to be positioned with extremely high accuracy, because the space for setting the starting position is further limited. In this sense, the viscosity of a resin for use in the hard coat layer 8, for instance, the viscosity of the UV-curing resin, is extremely important.

As electromagnetic waves for use in the present invention, which are used for initializing the recording layer, and carrying out the recording, reproducing and erasing operations, there can be employed laser beams, electron rays, X-rays, ultraviolet rays, visible rays, infrared rays, and microwave. Of these electromagnetic waves, semiconductor laser beams are considered most appropriate for use in the present invention because a semiconductor laser for producing semiconductor laser beams is compact in size.

As mentioned above, drive systems for the CD-RW have been actively developed and various matching tests have been conducted to evaluate the matching properties between the CD-RW and drive systems therefor. As a result, it has been confirmed that the following problems are caused, depending on the combination of the drive system and the CD-RW:

(1) After data is written in a program area, "Lead-In" and "Lead-Out" signals are respectively written inside and outside the program area with a pick-up device of the drive system. However, when the pick-up device performs a seek operation by crossing the program area in order to write the "Lead-In" and "Lead-Out" signals, the pick-up device cannot locate a necessary pickup position.

(2) The precision for determining an optimal recording power for the employed recording disc is so poor that in some cases, no optimal recording power cannot be determined.

(3) Errors increasingly occur when reproducing operation is carried out at a linear speed as high as 6× nominal CD speed or more (i.e. 7.2 m/s or more).

The above-mentioned problem (1) was found to be caused by insufficient or improper initialization of the recording layer. When the initialization of the recording layer is insufficient, the $R_{top}$ thereof is increased through the repetition of the overwriting operation. As a result, a push-pull magnitude and a radial contrast of the recording layer are decreased to such an extent that the tracking operation of the pick-up device becomes unstable and accurate seek cannot be performed.

Furthermore, when the initialization of the recording layer is improper, push-pull signals and $R_f$ signals are disturbed, so that the tracking operation of the pick-up device becomes unstable and accurate seek cannot be performed.

The above-mentioned problem (2) was found to be caused because no optimal recording power was determined. This is because when it was tried to determine the optimal recording power, using the OPC procedure, the modulation degree was not saturated even when the recording power was increased. It was found that these problems were also caused by the above-mentioned insufficient initialization and improper initialization.

After various studies, it was found that it is preferable that in order to determine the optimal recording power, the initialization be such that the groove reflectance of the optical recording medium be 95% or more of a saturated groove reflectance (Rg). The saturated groove reflectance means a maximum groove reflectance. The groove reflectance of 95% or more of the saturated groove reflectance can be obtained by appropriately adjusting the initializing conditions, such as the initializing power, the moving speed of light-application means over the recording medium during the initializing operation, and the linear speed of the disc during the initializing operation as shown in the graphs in FIGS. 6A, 6B and 6C.

More specifically, FIGS. 6A, 6B and 6C show graphs which respectively indicate (a) the relationship between the groove reflectance and the initializing power applied to a recording disc, (b) the relationship between the groove reflectance and the moving speed of the light-application means over the recording disc in the initializing operation, and (c) the relationship between the groove reflectance and the linear speed of the recording disc during the initializing operation.

As can be seen from these graphs shown in FIGS. 6A to 6C, the optimal initializing power range, the optimal moving speed range of the light-application means during the initializing operation, and the optimal linear speed range of the disc during the initializing operation can be determined so as to obtain the groove reflectance of 95% or more of the saturated groove reflectance.

In order to control the initialized state of each initialized phase-change recording medium, it is necessary that the traceability between a specific initializing apparatus and a specific phase-change recording medium initialized by the initializing apparatus be clarified in a plurality of initializing apparatus and a number of initialized phase-change recording media.

For the clarification of the above-mentioned traceability and from the viewpoint of the control of such initializing conditions, it is effective to place on the substrate of each phase-change recording medium a mark for identifying the initializing apparatus by which the phase-change recording medium is initialized at the initializing step.

As mentioned above with reference to FIG. 7, it is preferable that the mark 16 be placed at a position inside the innermost groove edge 15 by modulating the initializing power. When a plurality of initializing apparatus (for instance, apparatus No. 1 to No. 6) is employed to perform the initializing operation for phase-change optical recording discs, a one-dotted mark may be put on the recording disc which has been subjected to initialization, using the initializing apparatus No. 1 at a distance of 21 mm from the center of the disc, and a six-dotted mark may be similarly put on the recording disc subjected to initialization, using the apparatus No. 6, in such a manner that the number of the dots corresponds to the No. of the apparatus.

Alternatively, the initialization starting position on the recording disc may be changed for each initializing apparatus.

Furthermore, it is effective that the substrate bears an Absolute Time in Pre-groove data (ATIP data) including a predetermined optimum recording power for each recording disc in order to cope with the case where the optimum recording power cannot be determined by the OPC procedure.

The above-mentioned problem (3), that is, the problem that errors increasingly occur when reproducing operation is carried out at a linear speed as high as 6× nominal CD speed or more (i.e. 7.2 m/s or more), occurs when the groove reflectance of the recording medium is less than 0.18. The groove reflectance of the recording medium can be increased to 0.18 or more, for example, (i) by increasing the thickness of the first dielectric layer to 80 nm or more, (ii) by increasing the atomic % of Sb in the composition of the recording layer, (iii) by decreasing the thickness of the second dielectric layer, or (iv) by making a groove formed on the substrate wider and shallower.

The same effect as obtained by increasing the groove reflectance mentioned above can also be obtained by increasing the power of the reproduction light to 1.2 mW, 1.4 mW or 1.6 mW. When the variation in the performance of the drive systems and that in the reflectance of the recording media are taken into consideration, it is preferable to employ a reproduction light with a power of 1.2 mW or more for a reproduction operation at an 8× nominal CD speed (9.6 to 11.2 m/s). Furthermore, for a reproduction operation at a nominal CD speed as high as 12× (14.4 to 16.8 m/s), a reproduction light with a power of 1.4 mW or more is suitable. However, when the power of the reproduction light is 1.8 mW or more, the occurrence of errors is increased when the reproduction is repeated 1,000,000 times or more.

Figure 8A:
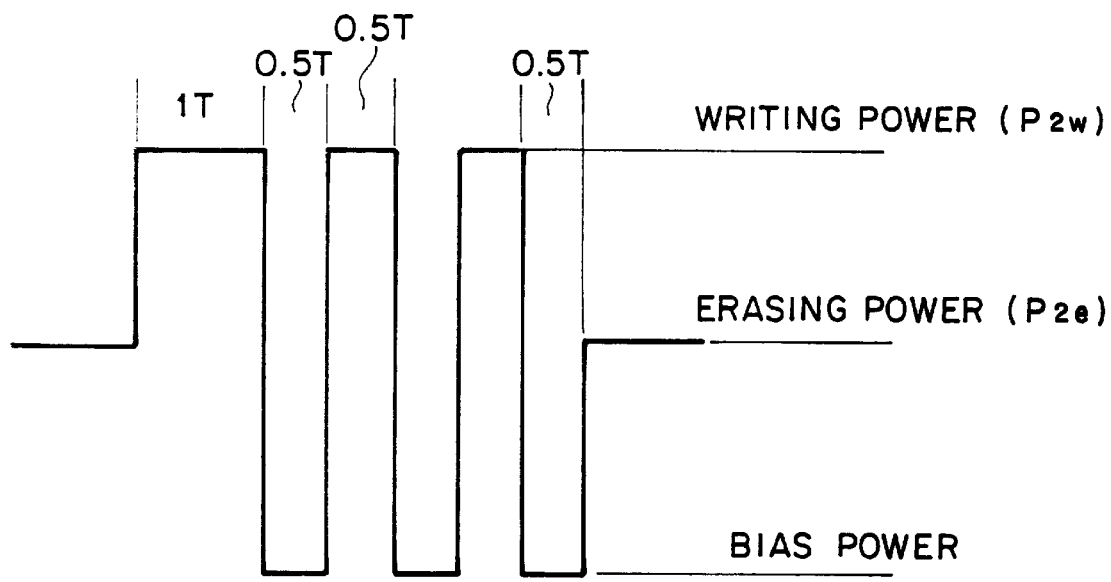
FIGS. 8A and 8B are graphs which respectively show a writing strategy for 2× nominal CD speed and that for 4× nominal CD speed.
Figure 8B:
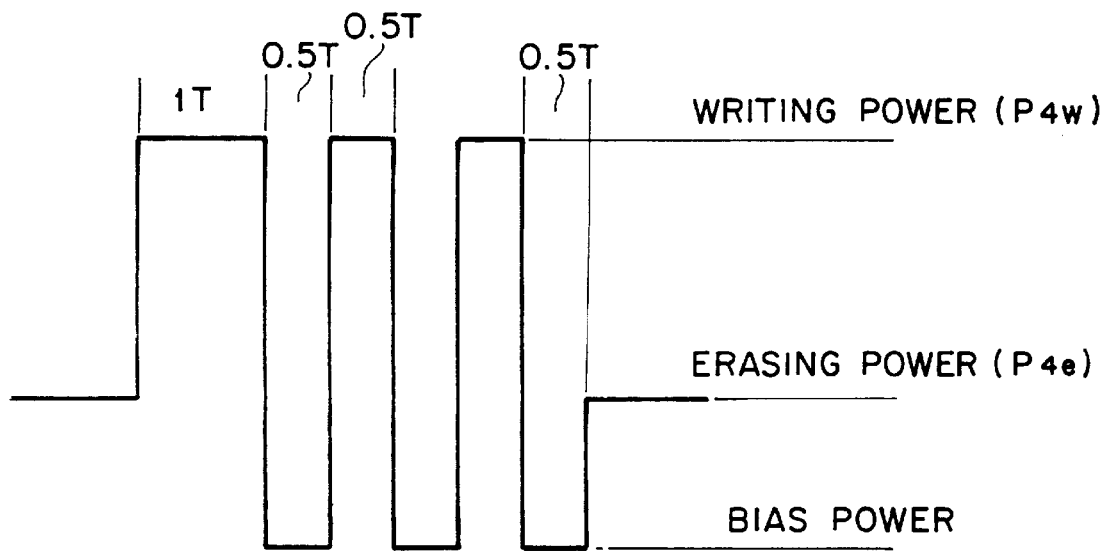

It is desired that CD-RW discs have at least such a recording performance that has a recording linear speed in the range of 2× nominal CD speed to 4× nominal CD speed. In 2× nominal CD speed recording/erasure, and in 4× nominal CD speed recording/erasure, the respective cooling rates of the phase-change recording medium when the medium is crystallized for erasing, and the respective cooling rates thereof when the medium is made amorphous for writing are different, so that the control of such cooling rates is of great importance. To be more specific, in a 2× nominal CD speed mode, it is relatively easy to crystallize the recording layer for erasure, but it is difficult to make the recording layer amorphous for writing. In contrast to this, in a 4× nominal CD speed mode, it is relatively easy to make the recording layer amorphous for writing, but it is difficult to crystallize the recording layer for erasure. In particular, at the recording in the 4× nominal CD speed mode, a problem that $R_{top}$ is reduced due to the increase in the erasing power. Therefore, it is effective to decrease the erasing power as shown in a strategy in FIG. 8B. To be more specific, it is preferable that the ratio of the erasing power ($P_{2e}$) to the writing power ($P_{2w}$) be 0.50 or 0.54 in the 2× nominal CD speed mode, and that the ratio of the erasing power($P_{4e}$) to the writing power ($P_{4w}$) be 0.46 or 0.50 in the 4× nominal CD speed mode.

Other features of this invention will become apparent in the course of the following description of exemplary embodiments, which are given for illustration of the invention and are not intended to be limiting thereof.

Examples 1 to 9 and Comparative Examples 1 to 4

A polycarbonate substrate disc with a thickness of 1.2 mm, provided with a guide groove with a width of about 0.5 μm and a depth of 35 nm on one side of the substrate, was cooled below 80° C.

A first dielectric layer, a recording layer, a second dielectric layer, and a light reflection & heat dissipation layer were successively provided on the above-mentioned polycarbonate substrate, using a sputtering apparatus. The material for the first and second dielectric layers was $ZnS.SiO_2$, the composition of a sputtering target for the formation of the recording layer in each of Examples 1 to 9 and Comparative Examples 1 to 4 is shown in TABLE 2, and the material for the light reflection & heat dissipation layer was an aluminum alloy.

Further, a hard coat layer was formed by spin coating an ultraviolet-curing resin on a non-grooved surface of the polycarbonate substrate, with the spin-coating of the ultraviolet-curing resin being started from a position at a distance of 20.5 mm away from the center of the disc.

An overcoat layer was formed by spin coating the same ultraviolet-curing resin as for the above-mentioned hard coat layer on the light reflection & heat dissipation layer. Thus, phase-change optical recording discs were made.

Using a plurality of initializing apparatuses equipped with a laser diode having a large spot size, each phase-change optical recording disc was initialized by crystallizing each recording layer under the conditions that the groove reflectance securely reached as high as 95% or more of the saturated groove reflectance. Further, in the course of the initializing operation, a dotted mark identifying the employed initializing apparatus was written on the non-grooved surface of the substrate at a distance of 21 mm from the center of the disc by modulating the initializing power.

Furthermore, a printing layer was provided on the overcoat layer.

Thus, disc-shaped phase-change optical recording media Nos. 1 to 9 of the present invention in Examples 1 to 9, and comparative disc-shaped phase-change optical recording media Nos. 1 to 4 in Comparative Examples 1 to 4 were fabricated.

TABLE 2 shows the thickness of each of the above-mentioned layers, the composition of the sputtering target for the formation of each recording layer, and the "recrystallization upper-limit linear speed" of each recording layer.

The performance of the thus fabricated phase-change optical recording media was evaluated using a CD-RW drive system for evaluation equipped with a pick-up with an NA of 0.5, using a light beam having a wavelength of 780 nm. The strategy was as follows:

The ratio of Easing power ($P_{2e}$) /Writing power ($P_{2w}$) 0.50

The ratio of Erasing power ($P_{4e}$) /Writing power($P_{4w}$) 0.46

Writing power: 13 mW (both in 2× and 4× nominal CD speed modes)

Bias power: 1 mW (both in 2× and 4× nominal CD speed modes)

Reproduction power: 1.0 mW

A block error rate (BLER) was measured after the direct overwriting operation was repeated 1,000 times.

The results are shown in TABLE 3.

As shown in TABLE 3, when the writing operation and the reproduction operation were carried out at 2× nominal CD speed, the block error rate was less than 100 cps in Examples 1 to 9, so that there were no problems with these recording media for use in practice.

In the case where the writing operation was carried out at 4× nominal CD speed and the reproduction operation was carried out at 2× nominal CD speed, there was a tendency that the greater the composition ratio of the element In in the composition of the recording layer, the greater the block error rate.

In the disc-shaped phase-change optical recording medium No. 9 fabricated in Example 9 of the present invention, the thickness of the first dielectric layer was as thin as 70 nm, so that the reflectance of the disc with respect to the light with a wavelength of 780 nm was 0.18 or less, and it was impossible to carry out the reproducing operation at 6× nominal CD speed because of the increase of block error rate. However, the block error rate was reduced to 250 cps when the reproduction power was changed from 1.0 to 1.2 mW.

TABLE 2

| | First Dielectric Layer Thickness (nm) | Recording Layer Composition (atom. %) | | | | | Recording Layer Thick-ness (nm) | Second Dielectric Layer Thickness (nm) | Light Reflection & Heat Dissipation Layer Thickness (nm) | Overcoat Layer Thickness (μm) | Hard Coat Layer Thickness (μm) | Recrystallization Upper-limit Linear Speed (m/s)* |
|---|---|---|---|---|---|---|---|---|---|---|---|---|
| | | Ag | In | Sb | Te | N | | | | | | |
| Ex. 1 | 100 | 5 | 9 | 56 | 30 | 0 | 25 | 25 | 140 | 7–12 | 3–6 | 3.0 |
| Ex. 2 | 95 | 5 | 7 | 58 | 30 | 0 | 22 | 30 | 150 | 7–12 | 3–6 | 4.7 |
| Ex. 3 | 95 | 5 | 6 | 60 | 28 | 1 | 25 | 35 | 150 | 7–12 | 3–6 | 3.8 |
| Ex. 4 | 95 | 5 | 5 | 60 | 30 | 0 | 22 | 35 | 160 | 7–12 | 3–6 | 4.5 |
| Ex. 5 | 95 | 4 | 3 | 60 | 33 | 0 | 20 | 30 | 160 | 7–12 | 3–6 | 2.8 |
| Ex. 6 | 90 | 3 | 5 | 62 | 30 | 0 | 25 | 40 | 180 | 7–12 | 3–6 | 4.8 |
| Ex. 7 | 90 | 3 | 5 | 62 | 29 | 1 | 30 | 20 | 100 | 8–12 | 3–6 | 3.5 |
| Ex. 8 | 80 | 1 | 6 | 63 | 28 | 2 | 20 | 25 | 120 | 10–15 | 3–6 | 3.9 |
| Ex. 9 | 70 | 1 | 6 | 65 | 23 | 5 | 25 | 25 | 140 | 9–15 | 4–7 | 4.0 |
| Comp. Ex. 1 | 95 | 5 | 17 | 60 | 18 | 0 | 20 | 35 | 150 | 7–12 | 3–6 | 6 |
| Comp. Ex. 2 | 95 | 8 | 5 | 58 | 27 | 2 | 22 | 35 | 140 | 7–12 | 3–6 | 2 |
| Comp. Ex. 3 | 95 | 4 | 3 | 58 | 31 | 4 | 22 | 35 | 150 | 7–12 | 2–5 | 2.2 |
| Comp. Ex. 4 | 100 | 4 | 3 | 65 | 28 | 0 | 16 | 40 | 140 | 7–12 | 3–7 | 5.5 |

(*) Beam power: 12 mW
Wavelength: 780 nm
NA: 0.5

TABLE 3

| | BLER in Reproduction Operation (2× nominal CD speed) after DOW (*) | | BLER in Reproduction Operation (6× nominal CD speed) after DOW (*) Writing at 2× nominal CD speed (cps)** | Reproduction by Light of 650 nm |
|---|---|---|---|---|
| | Writing at 2× nominal CD speed (cps)** | Writing at 4× nominal CD speed (cps)** | | |
| Ex. 1 | 40 | 140 | 550 | ∘ |
| Ex. 2 | 20 | 60 | 210 | ∘ |
| Ex. 3 | 12 | 32 | 110 | ∘ |
| Ex. 4 | 12 | 36 | 130 | ∘ |
| Ex. 5 | 12 | 28 | 100 | ∘ |
| Ex. 6 | 24 | 36 | 110 | ∘ |
| Ex. 7 | 20 | 56 | 95 | ∘ |
| Ex. 8 | 32 | 52 | 330 | ∘ |
| Ex. 9 | 36 | 40 | -(***) | ∘ |
| Comp. Ex. 1 | -(*) | -(*) | -(***) | ∘ |

TABLE 3-continued

| | BLER in Reproduction Operation (2× nominal CD speed) after DOW (*) | | BLER in Reproduction Operation (6× nominal CD speed) after DOW (*) | |
|---|---|---|---|---|
| | Writing at 2× nominal CD speed (cps)** | Writing at 4× nominal CD speed (cps)** | Writing at 2× nominal CD speed (cps)** | Reproduction by Light of 650 nm |
| Comp. Ex. 2 | 200 | 300 | -(***) | ○ |
| Comp. Ex. 3 | 50 | -(***) | 500 | ○ |
| Comp. Ex. 4 | -(*) | 200 | -(*) | ○ |

(*) BLER denotes "block error rate".
DOW denotes "direct overwriting".
(**) cps denotes "count per second".
(***) Reproduction operation was impossible.

Japanese Patent Application No. 9-239557 filed Aug. 15, 1997 is hereby incorporated by reference.

What is claimed is:

1. An optical recording medium capable of recording and erasing information, comprising: a substrate, a first dielectric layer, a recording layer, a second dielectric layer, a light reflection and heat dissipation layer, and an overcoat layer, said first dielectric layer, said recording layer, said second dielectric layer, said light reflection and heat dissipation layer, and said overcoat layer being successively overlaid on said substrate, said recording layer (1) comprising a phase-change recording material which comprises as constituent elements Ag, In, Sb, Te, and N and/or O with the respective atomic % thereof being $\alpha$, $\beta$, $\gamma$, $\delta$ and $\epsilon$ (the total atomic % of N and/or O), which are in the relationship of:

$0 < \alpha \leq 6$,
$3 \leq \beta \leq 15$,
$50 \leq \gamma \leq 65$,
$20 \leq \delta \leq 35$,
$0 \leq \epsilon \leq 5$, provided that $\alpha+\beta+\gamma+\delta+\epsilon=100$, and (2) having a recrystallization upper-limit linear speed in a range of 2.5 to 5.0 m/s.

2. The optical recording medium as claimed in claim 1, wherein said recording medium has a groove reflectance of 0.18 or more with respect to both of a reproduction light having a wavelength of 780 ±15 nm and a reproduction light having a wavelength of 640 ±15 nm.

3. The optical recording medium as claimed in claim 1, wherein said substrate bears an Absolute Time in Pre-groove data (ATIP data) including a pre-etermined optimum recording power for said optical recording medium.

4. The optical recording medium as claimed in claim 1, wherein said recording layer has a groove reflectance of 95% or more of a saturated groove reflectance thereof when said phase-change recording material is crystallized for initialization of said recording medium.

5. The optical recording medium as claimed in claim 1, wherein said recording layer carries thereon an identification information for identifying an initializing apparatus used to initialize said recording medium, using an initialization light having a predetermined initializing power.

6. The optical recording medium as claimed in claim 5, wherein said identification information is written in the form of a mark on a non-grooved surface of said substrate, using a light beam which is obtained by modulating said initializing power of said initialization light.

7. The optical recording medium as claimed in claim 1, further comprising a hard coat layer which is provided on a non-grooved surface of said substrate, opposite to said first dielectric layer with respect to said substrate.

8. The optical recording medium as claimed in claim 7, wherein said hard coat layer has a thickness of 2 to 6 $\mu$m and a pencil hardness of H or more.

9. The optical recording medium as claimed in claim 7, wherein said hard coat layer comprises a cured UV-curing resin which has a viscosity of 40 cps or more at room temperature before cured.

10. A method of recording information in a phase-change optical recording medium capable of recording information at a linear speed in a range of 2.4 to 5.6 m/s, and erasing recorded information therefrom, said phase-change optical recording medium comprising a substrate, a first dielectric layer, a recording layer, a second dielectric layer, a light reflection and heat dissipation layer, and an overcoat layer, said first dielectric layer, said recording layer, said second dielectric layer, said light reflection and heat dissipation layer, and said overcoat layer being successively overlaid on said substrate, said recording layer (1) comprising a phase-change recording material which comprises as constituent elements Ag, In, Sb, Te, and N and/or O with the respective atomic % thereof being $\alpha$, $\beta$, $\gamma$, $\delta$ and $\epsilon$ (the total atomic % of N and/or O), which are in the relationship of:

$0 < \alpha \leq 6$,
$3 \leq \beta \leq 15$,
$50 \leq \gamma \leq 65$,
$20 \leq \delta \leq 35$,
$0 \leq \epsilon \leq 5$, provided that $\alpha+\beta+\gamma+\delta+\epsilon=100$, and (2) having a recrystallization upper-limit linear speed ifn a range of 2.5 to 5.0 m/s, under the conditions that a ratio of erasing power ($P_{2e}$)/writing power ($P_{2w}$) at a linear speed in a range of 2.4 to 2.8 is greater than a ratio of erasing power($P_{4e}$)/writing power ($P_{4w}$) at a linear speed in a range of 4.8 to 5.6 m/s.

11. A method of reproducing information recorded in a phase-change optical recording medium capable of reproducing recorded information therefrom by controlling a reproduction light power of a reproduction light for reproducing recorded information in accordance with a reproduction linear speed, said phase-change optical recording medium comprising a substrate, a first dielectric layer, a recording layer, a second dielectric layer, a light reflection and heat dissipation layer, and an overcoat layer, said first dielectric layer, said recording layer, said second dielectric layer, said light reflection and heat dissipation layer, and said overcoat layer being successively overlaid on said substrate, said recording layer (1) comprising a phase-change recording material which comprises as constituent elements Ag, In, Sb, Te, and N and/or O with the respective atomic % thereof being $\alpha$, $\beta$, $\gamma$, $\delta$ and $\epsilon$ (the total atomic % of N and/or O), which are in the relationship of:

$0 < \alpha \leq 6$, $3 \leq \beta \leq 15$, $50 \leq \gamma \leq 65$, $20 \leq \delta \leq 35$, $0 \leq \epsilon \leq 5$, provided that $\alpha+\beta+\gamma+\delta+\epsilon=100$, and (2) having a recrystallization upper-limit linear speed in a range of 2.5 to 5.0 m/s, under the conditions that a ratio of erasing power ($P_{2e}$)/writing power ($P_{2w}$) at a linear speed in a range of 2.4 to 2.8 is greater than a ratio of erasing power ($P_{4e}$)/writing power ($P_{4w}$) at a linear speed in a range of 4.8 to 5.6 m/s.

* * * * *

UNITED STATES PATENT AND TRADEMARK OFFICE
CERTIFICATE OF CORRECTION

PATENT NO. : 5,974,025
DATED : October 26, 1999
INVENTOR(S) : KATSUYUKI YAMADA ET AL It is certified that error appears in the above-identified patent and that said Letters Patent is hereby corrected as shown below:

Column 2, line 61, change "carticular" to --particular--.

Column 12, line 26, change "C" to --O--.

Claim 10, line 21, change "ifn" to --in--.

Signed and Sealed this

Tenth Day of April, 2001

Attest:

NICHOLAS P. GODICI

Attesting Officer

Acting Director of the United States Patent and Trademark Office